March 14, 1967 J. D. MENG 3,309,587

CURRENT CONTROL CIRCUIT

Filed Aug. 1, 1963 2 Sheets-Sheet 1

INVENTOR.
JOHN D. MENG

BY

ATTORNEY

INVENTOR.
JOHN D. MENG
BY
ATTORNEY

United States Patent Office 3,309,587

Patented Mar. 14, 1967

3,309,587

CURRENT CONTROL CIRCUIT

John D. Meng, Phoenix, Ariz., assignor to General Electric Company, a corporation of New York Filed Aug. 1, 1963, Ser. No. 299,418

3 Claims. (Cl. 318—6)

This invention relates to current control circuits and more particularly to servo motor control circuits which are especially suited to regulate the amount of slack and the tension of the tape in magnetic tape handlers used in data processing systems.

Magnetic tape is widely used for storing information in high speed electronic data processing systems. The tape is usually carried on two storage reels, a supply reel and a take-up reel. As the tape is transferred from supply reel to take-up reel it moves against a magnetic tape head which can either "read" stored information from the tape or can "write" information on the tape for storage. For high speed storage and retrieval of data on the tape it is important that the tape head has rapid access to various points along the length of the tape. To provide rapid access the tape is driven intermittently with rapid acceleration and deceleration for quick starting and stopping, because the tape must be moving at a constant speed when information is being read from the tape or being written on the tape.

Since the supply and take-up reels and their associated tape reel motors have a considerable amount of inertia a pair of capstans having a much smaller mass are used to quickly bring the tape portion exposed to the head to desired speed or to quickly stop such tape portion. The reel system is combined with the capstan driving means by maintaining a slack loop of tape between each reel of tape and the corresponding capstan. These slack loops permit the tape reels and their driving reel motors to lag behind the capstan action during acceleration and deceleration of the tape. The slack loops must be maintained without undue tape tension or slack so as not to distort the recorded signal. Too much tension may stretch the tape thereby causing mechanical ripples in the tape. These ripples cause the tape to alternately move against and away from the tape head. The information being read from the tape or written on the tape is distorted and the amplitude is reduced. Too much slack may result in the tape being tangled. A spring-loaded take-up arm located between each capstan and the corresponding storage reel controls the length of slack and aids in providing proper tape tension.

Tape reel motors will produce undue tension or slack in the tape and may possibly stretch or break the tape if the motor speed cannot be smoothly and rapidly changed from one value to a different value when the capstans are accelerating or decelerating the tape portion exposed to the head. Prior art tape handlers employ a circuit comprising a plurality of mechanical switches to change tape reel motor speed. Such prior art handlers can provide only a limited number of discrete motor speeds and therefore lack the desired smooth and rapid speed change necessary to protect the tape. Additionally, the mechanical switches employed in the prior art motor speed controls cause difficulties due to corroding, burning and pitting of contacts and bending or breaking of parts of the switches. These switches are often critical to adjust for proper operation and do not operate properly if strain or vibration of the mountings occurs.

It is therefore the principal object of the present invention to provide a new and improved tape reel system for controlling tension of tape in magnetic tape handlers.

Another object of this invention is to provide a new tape reel motor control circuit which has smoother speed and direction control than the prior art circuits.

Another object of this invention is to provide a new and improved motor control circuit which is more reliable and trouble-free than the prior art circuits.

Another object of this invention is to provide a new and improved motor control circuit which is easier to install and adjust for proper operation than the prior art circuits.

Still another object of this invention is to provide a new and improved motor control circuit which is less expensive to construct than the prior art circuits.

A further object of this invention is to provide a new and improved control circuit.

The foregoing objects are achieved in a control circuit for a reversible electric motor wherein the amount of light from a pair of lamps is controlled to actuate a pair of light-responsive semiconductor devices. A pair of light-actuated semiconductor devices are controllably shielded from a pair of lamps by a shutter which is positioned by a load coupled to the motor. When the shutter is in a neutral position radiation from the lamps is prevented from reaching the light-actuated semiconductor devices by the shutter. When movement of the load displaces the shutter, light falling on one of the light-actuated devices causes it to conduct, thereby enabling a respective current controllable rectifier to conduct. Current through the current controllable rectifier, in turn controls the motor causing it to rotate in the proper direction and in turn moves the shutter in a direction toward the neutral position. The amount of current flowing through the motor corresponds to the distance the shutter is displaced from the neutral position.

Other objects and advantages of the invention will become apparent from the following detailed description when taken in connection with the accompanying drawings, wherein.

Figure 1:
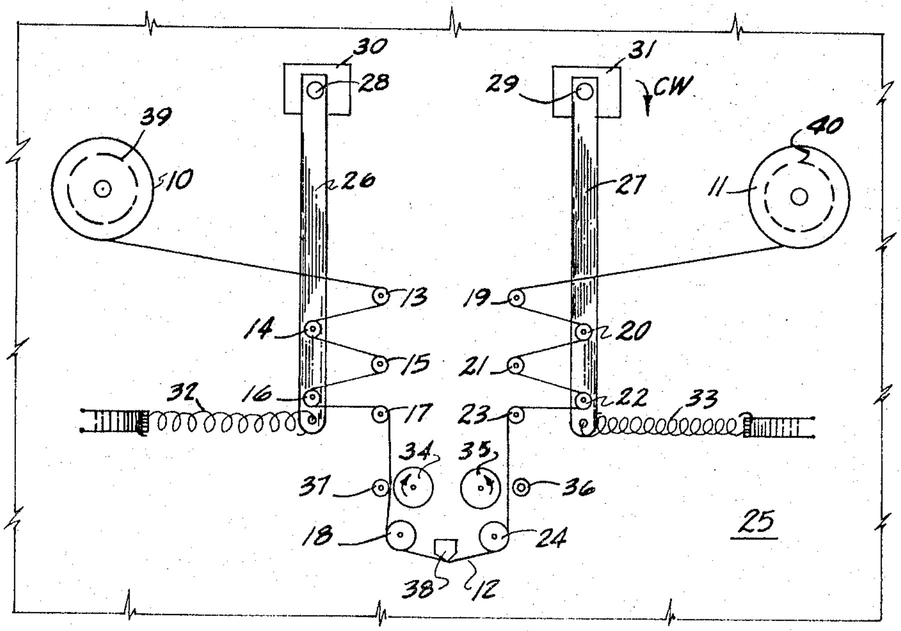
FIG. 1 is a plan view of a tape handler for control by the instant invention.

FIG. 1 illustrates a magnetic tape system comprising tape reels 10 and 11 upon which a magnetic tape 12 is wound. Tape 12 passes over a series of idler rollers 13–24 as it moves from one reel to the other. Idler rollers 13, 15, 17, 18, 19, 21, 23 and 24 are rotatably mounted on the frame 25 of the tape handler. Idler rollers 14 and 16 are rotatably mounted on moveable tape-up arms 26, and idler rollers 20 and 22 are rotatably mounted on moveable take-up arm 27. Take-up arms 26 and 27 are mounted at one end of each of respective shafts 28 and 29, which are in turn mounted for rotation in bushings 30 and 31 respectively. Bushings 30 and 31 are supported on the frame 25 of the tape handler.

A pair of springs 32 and 33 function to maintain tape 12 under tension. Spring 32 is mounted between take-up arm 26 and frame 25 of the tape handler. Spring 32 urges arm 26 away from fixedly mounted idler rollers 13, 15 and 17, and therefore, maintains tape 12 under tension. A spring 33 is mounted between take-up arm 27 and frame 25. Spring 33 urges arm 27 away from fixedly mounted idler rollers 19, 21 and 23 and maintains tape 12 under tension.

A pair of capstans 34 and 35 provide for rapid acceleration of tape 12 in either direction. Capstans 34 and 35 are continuously rotated in opposite directions at a constant speed by driving means not shown. When the tape is to be wound on the right hand reel 11 a pinch roller 36 is moved by means not shown, to press tape 12 against capstan 35. Tape 12 is accordingly rapidly accelerated to the right past the magnetic head 38. When a pinch roller 37 is moved to press tape 12 against capstan 34, the tape will rapidly accelerate toward the left, past head 38 for winding on reel 10. As tape 12 passes over head 38 information can be either read from the tape or written on the tape. Motors 39 and 40 drive respective reels 10 and 11 in the correct direction to maintain proper tape tension and the proper amount of tape slack between the respective capstan and the reel.

Figure 2:
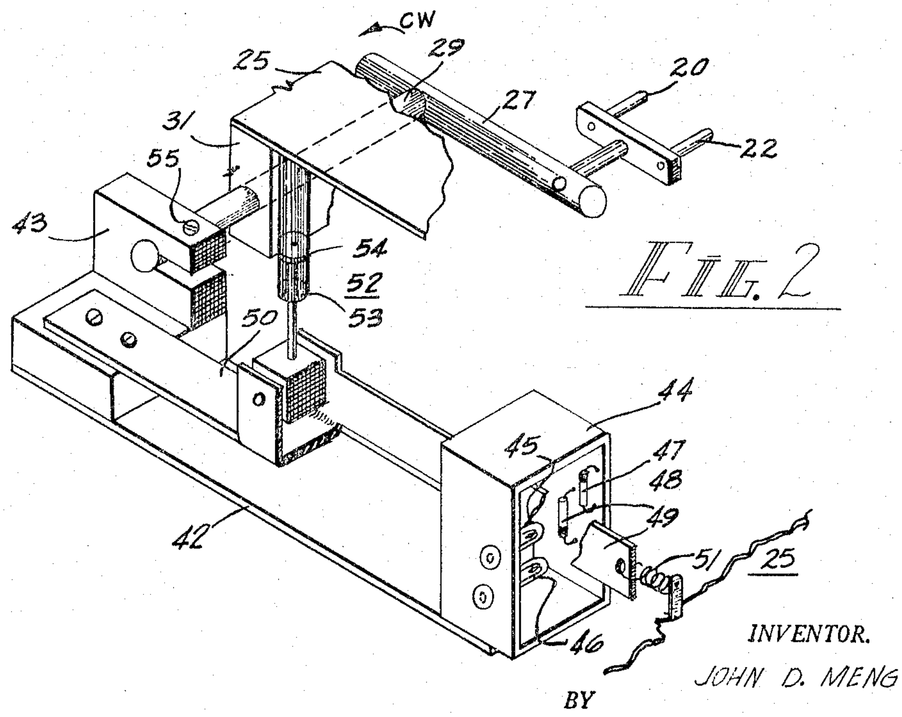
FIG. 2 is a perspective view of a portion of the present invention looking upwardly at tape handler of FIG. 1.

The other end of each of shafts 28 and 29 remote from the take-up arm is coupled to a motor control apparatus (FIG. 2) which provides speed and direction control for the respective one of motors 39 and 40. The mechanical structure of only one motor control apparatus will be described. An arm 42 is rigidly affixed to shaft 29 by a block 43 and rotates in correspondence with movements of take-up arm 27. A housing 44 is mounted on arm 42. Lamps 45 and 46 are affixed to one wall of housing 44 and light actuated electrical switches 47 and 48 are affixed to the opposite housing wall. A shutter 49 is positioned between the lamps and the light actuated switches. Shutter 49 prevents light from lamps 45 and 46 from falling on switches 47 and 48 when shutter 49 is in a neutral position relative to housing 44. Shutter 49 is an extension of a flexible arm 50, which has one end thereof affixed to the end of arm 42 remote from the housing 44. A spring 51, connected at one end to shutter 49 and at the other end to frame 25 provides a restraining force on the movement of shutter 49.

Relative movements between arm 42 and shutter 49 control the amount of light falling on switches 47 and 48. When take-up arm 27 is rotated clockwise by an increase in the tension of tape 12 carried on idler rollers 20 and 22 the coupled arm 42 also rotates in a clockwise direction. Flexible arm 50 and shutter 49 are rotated a lesser distance due to the restraining force exerted on shutter 49 by spring 51, thereby allowing light from lamp 45 to fall on light actuated switch 47. A decrease in the tape tension permits spring 33 to urge arms 27 and 42 to rotate in a counterclockwise direction thereby allowing light from lamp 46 to fall on light actuated switch 48.

A pneumatic dashpot 52 comprising a cylinder 53 mounted on the frame 25 and a piston 54 connected to the flexible arm 50 and shutter 49, eliminates bounce of shutter 49 and improves operation of the servo motor. The force exerted by the dashpot on arm 50 is proportional to the velocity of arm 42. For relatively rapid movements of arm 42, dashpot 52 exerts a strong restraining force on arm 50, causing shutter 49 to lag further behind the movement of arm 42 than would occur otherwise, thereby allowing more light from lamp 45 or 46 to fall on light actuated switches 47 or 48. For slow movements of arm 42 the force exerted by the dashpot on arm 50 is small and has little effect on the movement of arm 50. The relative position of arms 42 and 27 can be adjusted by loosening a set screw 55 in block 43, rotating shaft 27 through the desired angle relative to arm 42 and tightening set screw 55. The circuit of FIG. 3 co-operates with the mechanism illustrated in FIG. 2 to provide control of reversible motor 40. A similar circuit and mechanism provide control of motor 39. The speed of a reversible motor is determined by the voltage across the field and armature windings. The amount of current through the field and armature windings determines the torque which will be obtained. The motor is provided with two field windings, one designated as the forward winding and one designated as the reverse winding. When current flows through the forward winding and the armature, the motor will rotate in one direction called the forward direction. When current flows through the reverse winding and the armature, the motor will rotate in the other, or reverse direction.

Figure 3:
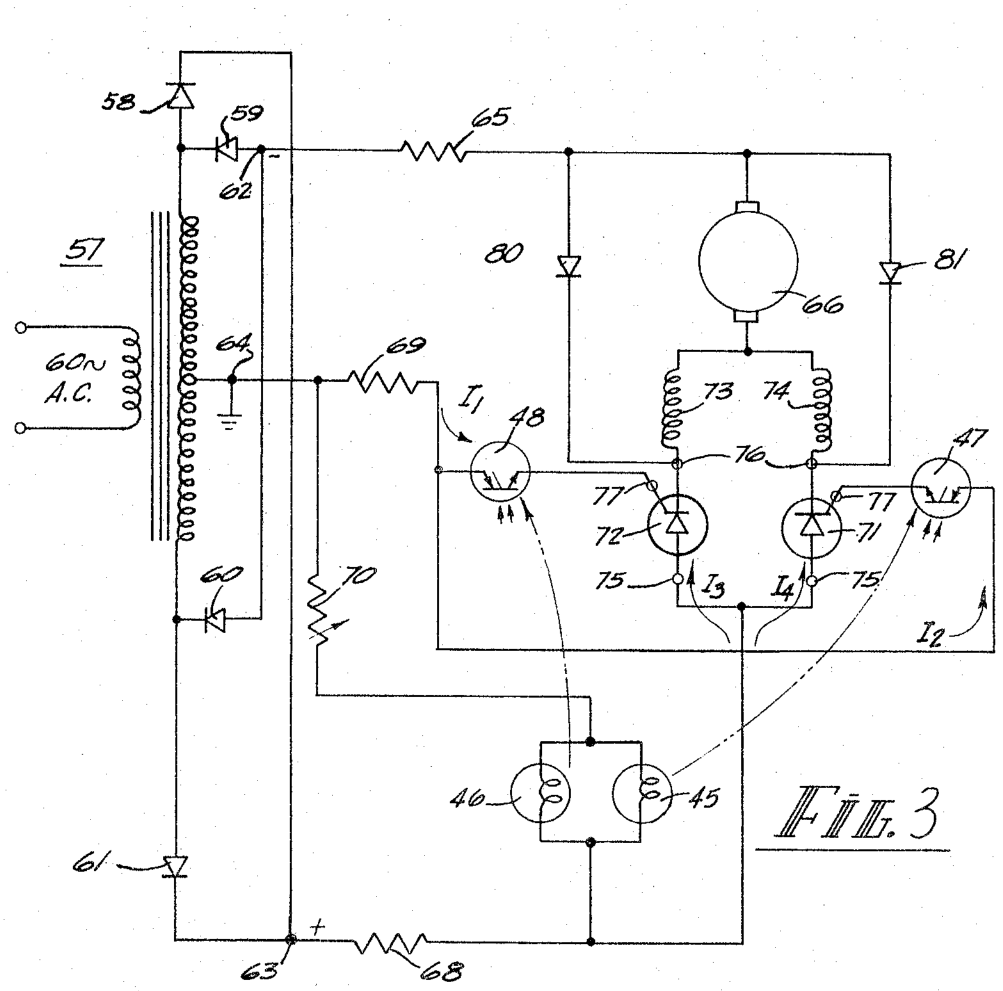
FIG. 3 is a circuit diagram of the present invention.

A transformer 57, energized from an alternating current power source provides power for the circuit of FIG. 3. A pair of diodes 58 and 59 have opposite electrodes connected to one end of the secondary winding of transformer 57. A pair of diodes 60 and 61 have opposite electrodes thereof connected to the other end of the secondary winding of transformer 57. The other electrodes of diodes 58 and 61 are connected to the terminal 63. The other electrodes of diodes 59 and 60 are connected to the terminal 62. Accordingly, transformer 57 with diodes 58, 59, 60 and 61 function as a full-wave rectifier circuit to provide positive unidirectional voltage pulses between terminals 63 and 62. A terminal 64 is connected to the center of transformer 57. Terminal pair 63 and 64 and terminal pair 64 and 62 each provide positive pulses thereacross having one half the amplitude of the pulses provided by terminal 63 and 62.

A resistor 65 has one end thereof connected to terminal 62 and functions to limit the peak current delivered by the rectifier circuit to a load circuit which includes the armature 66 of motor 40. The feedback resistor 68 has one thereof connected to terminal 63 and the other connected to lamps 45 and 46 and functions to reduce the voltage across lamps 45 and 46 when current through the motor armature 66 is high and thereby provides electrical damping for the motor.

Light actuated switches 47 and 48 function to control the rate and direction of rotation of motor 40 in response to light received from respective lamps 45 and 46. A resistor 69 has one end thereof connected to terminal 64 and the other end thereof connected to the anode of each of switches 47 and 48. Light actuated switches 47 and 48 are semiconductor devices which are known in the art. One such light actuated switch which is useful in this circuit is the L7B switch manufactured by the General Electric Rectifier Components Department. Other types can also be used in this circuit.

A light actuated switch is a two-terminal semiconductor device which can be used as an ON-OFF switch. The switch acts as an open circuit when the amount of light falling on the light sensitive region is less than a critical value and no current can flow from anode to cathode thereof. If the amount of light exceeds the critical value the switch fires or turns on. When the light actuated switch fires it readily conducts current from the anode to the cathode. Once the switch fires the only way in which it can again become an open circuit is by reducing the current through the switch below the value of a "holding current," which is the minimum current required to maintain the light actuated switch in the conductive condition.

Resistors 69 and 70 provide current control in the circuit. Resistor 70, which has one end thereof connected to terminal 64 and the other end thereof connected to lamps 45 and 46, can be varied to adjust the light from lamps 45 and 46. Individual light actuated switches 47 and 48 may require a particular amount of light for best motor control. Adjustment of this light with resistor 70 is the only adjustment required in the circuit of this invention. Prior art circuits require that each of the plurality of individual switch contacts be bent and adjusted for proper operation. Resistor 69 limits the peak current through light actuated switches 47 and 48.

Silicon Controlled Rectifiers 71 and 72 control directly the current through motor 40. Rectifiers 71 and 72 each comprise an anode 75, a cathode 71, and a gate 77. Anodes 75 of the two rectifiers are connected together and to the common connection point between lamps 45 and 46 and resistor 68. Gate 77 of rectifier 71 is connected to the cathode of switch 47. Gate 77 of rectifier 72 is connected to the cathode of switch 48. Silicon Controlled Rectifier 71 has a cathode 76 thereof connected to one end of field winding 74. Rectifier 71 controls the current through the reverse field winding 74 and motor armature 66 when in its conductive state.

Silicon Controlled Rectifier 72 has the cathode 76 thereof connected to one end of a field winding 73. Rectifier 72 controls the current through the forward field winding 73 and motor armature 66 when in its conductive state. When current flows through winding 73 and armature 66, motor 40 rotates in a forward direction. When current flows through winding 74 and armature 66, motor 40 rotates in the reverse direction. A Silicon Controlled Rectifier useful in this circuit is the C15B rectifier manufactured by the General Electric Rectifier Components Department. Other types can also be used in this circuit.

The Silicon Controlled Rectifier is a semiconductor device which can be used as an ON-OFF switch and which can be turned on by a small gate current in a very few microseconds. Normally the Silicon Controlled Rectifier cannot conduct current between anode and cathode thereof until a pulse of current flows from gate to cathode. If a positive voltage difference exists between the anode and cathode when the pulse of current flows in the gate the Silicon Controlled Rectifier is rendered conductive and a current will flow from the anode to the cathode. Once anode-cathode current flow commences the gate has no further control over such current flow. Current flow from anode to cathode in the rectifier can only be terminated by reducing the anode to cathode current below a "holding" or minimum current value. A more detailed description of the operation of a Silicon Controlled Rectifier can be found in the "Silicon Controlled Rectifier Manual" second edition, published by General Electric, Auburn, New York.

The load between terminals 62 and 64 comprise, predominantly, motor 40. One end of motor armature 66 is connected to an end of each winding 73 and 74. The other end of armature 66 is connected to one end of resistor 65. A diode 80 is connected across armature 66 and winding 73. A diode 81 is connected across armature 66 and winding 74. Lamps 45 and 46 are positioned and the light output therefrom is controlled by shutter 49 (FIG. 2) so that current flows through neither or but one, of respective switches 47 and 48. The amount of current through switches 47 and 48 determines whether a respective one of rectifiers 71 and 72 can conduct between anode and cathode thereof and thereby determines the direction of rotation of motor 40.

Thus the objects set forth herein are realized by the instant invention wherein a pair of light actuated switches, a pair of Silicon Controlled Rectifiers and a pair of lamps, connected and disposed in a novel arrangement are employed instead of a much more expensive plurality of mechanical switches used in the prior art. Furthermore, the normal useful life of the lamps and semiconductor devices used in the present invention is many times that of the useful life of the mechanical switches. Additionally, the difficulty of initial adjustment of the switches of the prior art devices has been eliminated in the instant invention.

The operation of the circuit of FIG. 3 will now be described. When take-up arm 27 is positioned so that shutter 49 is centered between lamps 45 and 46 and light actuated switches 47 and 48, no light falls on either switches 47 or 48. Accordingly, switches 47 and 48 will both be nonconductive, so that Silicon Controlled Rectifiers 71 and 72 will also be nonconductive. Thus, in this position of arm 27 no current flows through field winding 73 or 74 and motor 40 will not rotate.

Upon acceleration of tape 12 to the right, motor 40 is correspondingly accelerated to maintain substantially constant tape tension. When pinch roller 36 is pressed against capstan 35, tape 12 is accelerated toward reel 11 and the increased slack and decreased tension in the tape between the capstan 35 and reel 11 will allow take-up arm 27 and rigid arm 42 to rotate counterclockwise. Since dashpot piston 54 retards the movement of flexible arm 50, shutter 49 moves through a large distance relative to housing 44 so that much light from lamp 46 falls on light actuated switch 48 rendering it conductive but no light falls on switch 47. Current pulses $I_1$, (FIG. 3) now flow from center terminal 64 through resistor 69, light actuated switch 48, gate 77 and cathode 76 of Silicon Controlled Rectifier 72, forward field winding 73, motor armature 66 and resistor 65 to terminal 62, thereby enabling Silicon Controlled Rectifier 72 to conduct. Current pulses $I_3$ now flow from terminals 63, through resistor 68, Silicon Controlled Rectifier 72, forward field winding 73, armature 66, and resistor 65 to terminal 62. Current pulses $I_3$ thereby cause the motor 40 to rotate in the forward or counterclockwise direction, winding tape onto reel 11 and reducing the slack and increasing the tension in tape 12 between capstan 35 and reel 11. This current $I_3$ flows during a portion of each half cycle of applied voltage whenever flexible arm 50 and rigid arm 42 are not aligned. As long as the tape is being moved toward reel 11 by capstan 35, take-up arm 27 and rigid arm 42 are displaced counterclockwise from their stationary or neutral positions occupied when the tape is stationary. In these circumstances, shutter 49 will be displaced through a lesser angle than arm 42 due to the restraining action of centering spring 51, so that some light from lamp 46 will continue to fall on light actuated switch 48 and reel motor 40 will continue to rotate in a counterclockwise direction.

Upon deceleration of the tape 12, motor 40 is correspondingly decelerated to continue to maintain substantially constant tape tension. When pinch roller 36 is released from pressing against capstan 35 the portion of tape 12 near the magnetic head stops. However, reel 11 and motor 40 will momentarily continue to run due to inertia and take-up arm 27 does not immediately return to its neutral position. Therefore, tape slack decreases and tension increases between capstan 35 and reel 11 causing arms 27 and 42 to rotate clockwise. Since dashpot piston 54 temporarily retains flexible arm 50 from following the clockwise rotation of arm 42, shutter 49 moves relative to housing 44, so that light from lamp 45 now falls on light actuated switch 47 rendering it conductive. Current through switch 47 enables Silicon Controlled Rectifier 71 to conduct. Current pulses $I_4$ now flow from terminal 63 through resistor 68, Silicon Controlled Rectifier 71, reverse field winding 74, motor armature 66 and resistor 65 to terminal 62, thereby providing braking action for the still counterclockwise rotating motor 40, and bringing motor 40 to a rapid stop.

In a manner similar to that described above the apparatus of the instant invention will rapidly accelerate motor 40 in a clockwise direction when tape 12 is moved to the left past head 38, and will provide a rapid braking action to stop motor 40 when tape motion to the left is terminated.

Figures 4, 5:
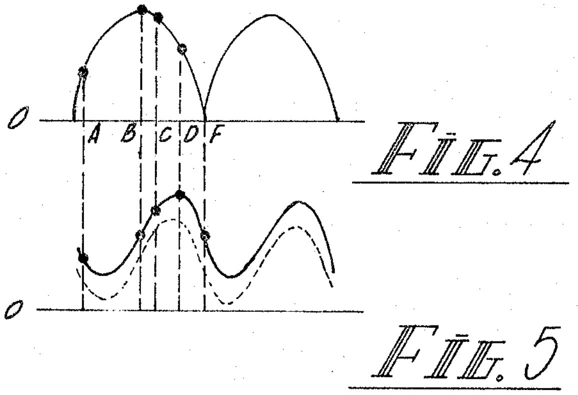
FIGS. 4 and 5 are wave forms useful in explaining the operation of the instant invention.

As described herein, the rate of rotation of motor 40 is determined by the amount of light received by one of switches 47 and 48. The manner in which such speed control occurs will be described with the aid of the wave forms of FIGS. 4 and 5. FIG. 4 shows the voltage pulses supplied between terminals 63 and 62. Theoretically, the speed at which motor 40 rotates is determined by the average voltage across the motor windings. Therefore, if the voltage pulses of FIG. 4 are applied to the field winding and motor armature from time A to time F of each pulse, the motor speed will be greater than it would if the pulses were applied only during the period from time C to time F.

The solid line wave form in FIG. 5 illustrated the amount of light provided by each of lamps 45 and 46 in response to the voltage pulses across terminals 63 and 64. The pulses across terminals 63 and 64 correspond in time with the pulses (FIG. 4) across terminals 63 and 62, and have but one half the amplitude. The solid line wave form of FIG. 5 is illustrated in correct time relationship to the wave form of FIG. 4, and therefore, demonstrates that the light output of lamps 45 and 46 lag the voltage applied thereto.

The dashed line wave form in FIG. 5 represents a reduced amount of light reaching switches 47 and 48 due to the interference of shutter 49 or due to a reduction in the amplitude of the voltage pulses applied to lamps 45 and 46. If shutter 49 completely obscures one of lamps 45 or 46 no light reaches the corresponding one of switches 47 and 48. If shutter 49 is displaced slightly from its central position relative to housing 44 only a small amount of the light emitted from a lamp 45 or 46 will reach its corresponding switch. Accordingly, such switch will not fire until a high point in the light wave form, such as at time D, is reached. The corresponding one of Silicon Controlled Rectifiers 71 or 72 will then be enabled for conduction, but will only conduct from time D to time F. At time F the voltage applied to the Silicon Controlled Rectifier drops below the holding value and current ceases. Therefore, the pulse of voltage will be applied to motor 40 only during the duration from time D to time F. The average voltage for such a short time duration is relatively low and the motor will rotate at a relatively low speed.

If shutter 49 is now displaced further from its neutral position more light from a lamp will reach a corresponding switch, so that the switch may be fired at time C. In such instant the corresponding Silicon Controlled Rectifier will conduct from time C to time F, and a higher average voltage will be applied to the motor and the motor will rotate more rapidly. Accordingly, the instant invention provides for a smooth, wide, and continuous range of motor speeds, in both directions of rotation from motor 40.

Diodes 80 and 81 prevent the inductance of the armature and field windings from sustaining current flow when the source voltage decreases to zero. When the applied voltage decreases the inductance of the conducting field winding and motor armature 66 develops a reverse voltage which tends to maintain current flowing through the corresponding Silicon Controlled Rectifier 71 or 72 beyond time F on the wave form of FIG. 4. However, if winding 73 is conducting, diode 80 provides a short circuit for such reverse voltage thereby preventing it from maintaining rectifier 72 conductive. Similarly, diode 81 prevents reverse voltage, developed when winding 74 is conducting, from maintaining rectifier 71 conductive.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A motor control circuit for use with a source of unidirectional pulses, a reversible electric motor, and a mechanical device to indicate position of a load coupled to said motor comprising a pair of electric lamps, means for applying said pulses to said lamps, means for controlling light output of said lamps, a pair of light actuated switches, means for controlling current through said switches, said pair of lamps being radiation-coupled to said pair of switches, a shutter, said shutter being positioned by said mechanical device to control the amount of light from said lamps falling upon said switches, a mechanical damping means, said damping means being connected to said shutter, a pair of current controlling means, said current controlling means interconnecting said source of pulses and said motor, said switches being directly connected to said controlling means to control current from said source of pulses to said reversible motor, and electrical damping means, said damping means being connected between said source of pulses and said current controlling means, said damping means being coupled to said sources of radiation, said electrical damping means controlling light output of said lamps in response to current through said motor.

2. A motor control circuit for use with a source of unidirectional pulses, a reversible electric motor, and a mechanical device to indicate position of a load coupled to said motor comprising first and second electric lamps, means for applying said pulses to said lamps, means for controlling light output of said lamps, first and second light actuated switches, means for controlling current through said switches, said first lamp being radiation-coupled to said first switch, said second lamp being radiation-coupled to said second switch, a shutter, said shutter being positioned by said mechanical device to prevent light from said lamps from falling on said switches when shutter is in a neutral position, the amount of light from said first lamp reaching said first switch corresponding to distance said shutter is displaced from said neutral position in one direction; the amount of light from said second lamp reaching said second switch corresponding to distance said shutter is displaced from said neutral position in opposite direction, a mechanical damping means, said damping means being connected to said shutter, first and second controllable rectifier, said source of pulses being coupled to said motor by said first and said second controllable rectifiers, said first switch being directly connected to said first controllable rectifier to control current from said source of pulses to said motor, said second switch being directly connected to said second controllable rectifier to control current from said source of pulses to said motor, current through said first or said second rectifier causing said motor to rotate in the direction tending to return said shutter to said neutral position, and electrical damping means, said damping means being connected between said source of pulses and said current controlling means, said damping means being coupled to said sources of radiation, said electrical damping means controlling light output of said lamps in response to current through said motor.

3. A tape reeling control circuit to regulate slack and tension of magnetic tape by responding to position of a movable tape take-up arm for use with a source of unidirectional pulses and a mechanical device to indicate position of said take-up arm comprising a reversible electric motor, said motor having an armature and first and second field windings, said armature being coupled to wind said tape, position of said take-up arm corresponding to tension of said tape, first and second electric lamps, means for applying said pulses to said lamps, means for controlling light output of said lamps, first and second light actuated switches, means for controlling current through said switches, said first lamp being radiation-coupled to said first switch, said second lamp being radiation-coupled to said second switch, a shutter, said shutter being positioned by said mechanical device to prevent light from said lamps from falling on said switches when shutter is in a neutral position, the amount of light from said first lamp reaching said first switch corresponding to distance said shutter is displaced from said neutral position in one direction; the amount of light from said second lamp reaching said second switch corresponding to distance said shutter is displaced from said neutral position in opposite direction, a mechanical damping means, said damping means being connected to said shutter, first and second controllable rectifier, said source of pulses being coupled to said first winding by said first rectifier, said source of pulses being coupled to said second winding by said second rectifier, said first switch being directly connected to said first rectifier to control current from said source of pulses to said first winding of said motor, said second switch being directly connected to said second rectifier to control current from said source of pulses to said second winding of said motor, the amount of said current through said windings corresponding to distance said shutter is displaced from said neutral position, current through said first or said second winding causing said motor to rotate in the direction tending to return said shutter to said neutral position, and electrical damping means, said damping means being connected between said source of pulses and said current controlling means, said damping means being coupled to said sources of radiation, said electrical damping means controlling light output of said lamps in response to current through said motor.

References Cited by the Examiner

UNITED STATES PATENTS

| | | | |
|---|---|---|---|
| 2,431,578 | 11/1947 | Mayer et al. | 318—345 X |
| 2,583,153 | 1/1952 | Osbon | 318—6 X |

| | | | |
|---|---|---|---|
| 2,586,076 | 2/1952 | Nichols | 318—6 |
| 2,698,392 | 12/1954 | Herman. | |
| 2,708,731 | 5/1955 | Morel et al. | 318—345 X |
| 2,799,820 | 7/1957 | Gutterman | 318—345 |
| 2,875,392 | 2/1959 | Pinckaers. | |
| 2,977,523 | 3/1961 | Cockrell. | |
| 2,985,396 | 5/1961 | Johnson | 318—7 X |
| 3,092,764 | 6/1963 | Cooper | 318—6 |
| 3,105,179 | 9/1963 | Young et al. | 318—6 |

ORIS L. RADER, *Primary Examiner.*

T. LYNCH, B. DOBECK, *Assistant Examiners.*